United States Patent [19]

Miyao et al.

[11] Patent Number: 4,814,987

[45] Date of Patent: Mar. 21, 1989

[54] TRANSLATION SYSTEM

[75] Inventors: Kouji Miyao, Kashihara; Hitoshi Suzuki, Nara; Hazime Asano, Nara; Shinji Tokunaga, Nara; Yasuhiro Takiguchi, Nara; Shuzo Kugimiya, Yamatokoriyama, all of Japan

[73] Assignee: Sharp Kabushiki Kaisha, Osaka, Japan

[21] Appl. No.: 864,256

[22] Filed: May 19, 1986

[30] Foreign Application Priority Data

May 20, 1985 [JP] Japan .................. 60-109154
May 20, 1985 [JP] Japan .................. 60-109155

[51] Int. Cl.⁴ .................................. G06F 15/38
[52] U.S. Cl. ........................... 364/419; 364/900
[58] Field of Search ............ 364/419, 200, 900; 434/157

[56] References Cited

U.S. PATENT DOCUMENTS

| | | | |
|---|---|---|---|
| 4,460,973 | 7/1984 | Tanimoto et al. | 364/900 |
| 4,498,143 | 2/1985 | Strzelecki | 364/900 |
| 4,507,750 | 3/1985 | Frantz et al. | 364/419 |
| 4,509,137 | 4/1985 | Yoshida | 364/900 |
| 4,509,138 | 4/1985 | Hayashi et al. | 364/900 |
| 4,518,361 | 5/1985 | Conway | 364/419 |
| 4,543,631 | 9/1985 | Kuroso et al. | 364/419 |
| 4,584,667 | 4/1986 | Hashimoto et al. | 364/419 |
| 4,654,798 | 3/1982 | Taki | 364/419 |
| 4,661,924 | 4/1987 | Okamoto et al. | 364/419 |

FOREIGN PATENT DOCUMENTS

| | | |
|---|---|---|
| 0175357 | 3/1986 | European Pat. Off. . |
| 0189665 | 8/1986 | European Pat. Off. ........ 364/419 |
| 56-42880 | 4/1981 | Japan . |
| 56-71142 | 6/1981 | Japan . |
| 1239920 | 7/1971 | United Kingdom . |

Primary Examiner—Joseph Ruggiero
Assistant Examiner—Kim Thanh Tbui
Attorney, Agent, or Firm—Birch, Stewart, Kolasch & Birch

[57] ABSTRACT

One translating system is disclosed in which a first translation mode for translating sentences in a unit of one sentence or a second translation mode for translating sentences in a package may be selectively chosen. Further, in this translation system, sentences to be translated can be entered either by direct data entry such as a keyboard or by indirect data entry such as an external device.

10 Claims, 6 Drawing Sheets

Buffer A — Original Text Buffer (1)
| t | h | i | s | | | | |
|---|---|---|---|---|---|---|---|
| i | s | | | | | | |
| a | | | | | | | |
| p | e | n | | | | | |
| . | | | | | | | |

Buffer B — A Part of the Buffer after Consulting Dictionary (2)

this — — | 代名詞 (Pronoun) | (Demonstrative Adjective) |
is — — | 動詞 (Verb) | |
a — — | 冠詞 (Article) | |
pen — — | 名詞 (Noun) | |

Buffer C — Buffer after Constructional Analysis (3)

Buffer D — Buffer after Analyzing by Tree Strcture (4)

Buffer E — Buffer for Outputting the Sentence (5) これはペンである。

( Kore wa pen de aru. )

TRANSLATION SYSTEM

BACKGROUND OF THE INVENTION

1. Field of the Invention

The present invention is related to a dialogical translation system for completing a correct translation in cooperation with a translation machine.

2. Description of the Prior Art

Recently, some translation systems for translating one original language into one or more other languages have been proposed.

Meanwhile, since the translation systems of this type have been developed mainly to improve the accuracy in translation, they are not well developed so as to be able to respond to various needs sought by users.

For instance, in one conventional translation system, an entry means for entering one or more sentences to be translated is limited to a direct data entry means such as a keyboard means and, in another type of translation system, it is limited to an indirect data entry means for reading sentence data stored in an external memory means such as a floppy disk. In other words, there has been no known translation system capable of selecting either the direct data entry means or indirect data entry means according to its necessity.

Also, in the conventional translation system, the translation mode is limited to a mode for translating one or more sentences in a unit of one sentence or to a mode for translating a lump of sentences in a package. Namely, there has been no translation system which is able to select either one sentence translation mode or a package translation mode according to its necessity.

Generally speaking, in the machine translation, it is inevitable that a plurality of possible translations are obtained since every language itself has some ambiguities. Therefore, it becomes necessary to display each possible translation obtained successively in order for a user to select the correct translation.

As an exammple, let us consider translations of three English sentences as follows:

(1) I had 300 dollars yesterday.
(2) I bought a car with 200 dollars today.
(3) So I have 100 dollars now.

Among these three sentences, sentences (1) and (3) have no ambiguity respectively, only one possible translation can be obtained and it might be correct. However, the sentence (2) has some ambiguities in the subordination as shown in FIG. 7. In this case, two possible translations may be obtained according to the subordination relations indicated by arrows P and Q respectively. In the translation system, first and second possible translations are displayed successively and the user will select the latter one obtained according to the subordination indicated by the arrow Q as a correct translation.

In such a machine translation, the following three needs may be essential to users.

(A) It is needed to obtain an outline of sentences in a short time without demanding high accuracy in translation. Accordingly, this requires a function being able to translate a lump of sentences in a package. In such a package translation, only the first possible translation of each sentence is output although one or more incorrect translations may be contained in the translations obtained.

(B) It is needed to obtain an exact translation although it is time consuming. In such a case, each possible translation is output successively to obtain a correct translation for every sentence.

(C) It is needed at first to grasp an outline by a package translation and then to correct translations supposed to be incorrect referring to the outline obtained. This may enhance the efficiency of translation as a whole.

As mentioned above, the conventional machine translation system is specialized to the mode (A) or (B) and is impossible to operate under the mode (C).

SUMMARY OF THE INVENTION

One of the objects of the present invention is to provide a translation system which is capable of translating sentences to be translated in a unit of one sentence (one by one) and/or translating sentences to be translated in a package.

Another object of the present invention is to provide a translation system in which sentences to be translated can be entered with a direct data entry means such as a keyboard and/or by an indirect data entry means such as an external memory means.

A further object of the present invention is to provide a translation system being capable of corresponding to various users' needs to enhance the efficiency in translation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects and features of the present invention will become apparent from the following description taken in conjunction with the preferred embodiment thereof with reference to the accompanying drawings which are given by way of illustration only, and thus are not limitative of the present invention, and in which.

DETAILED DESCRIPTION OF THE PREFERRED EMBODIMENTS

Figure 1:
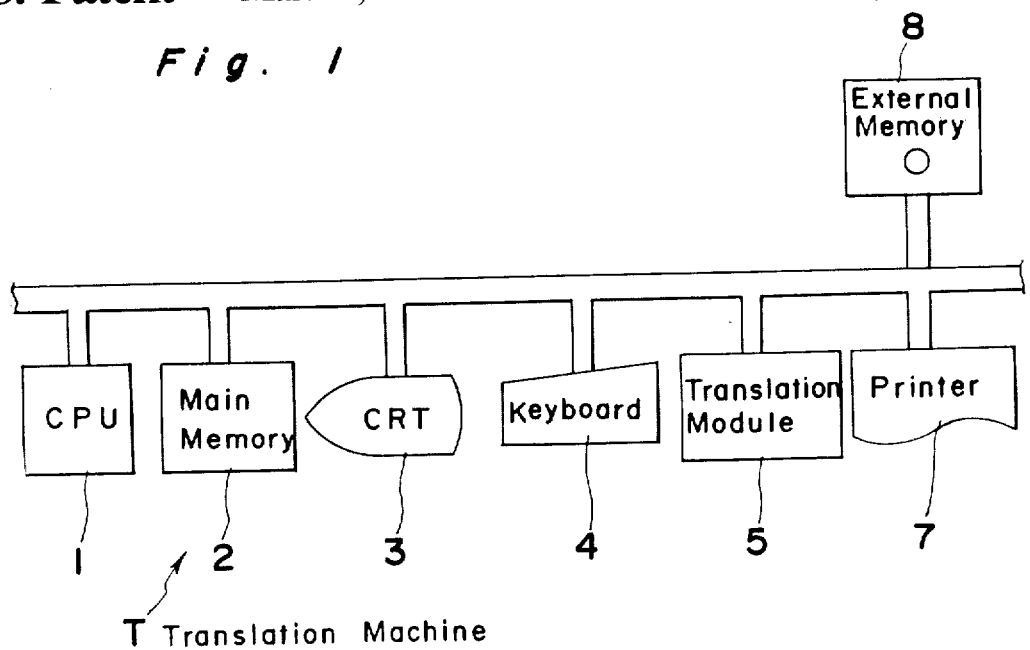
FIG. 1 is a block diagram showing a translation machine to which the present invention can be applied.

Referring in detail to the drawings and with particular reference to FIG. 1, a block diagram of a translation machine T according to the present invention is shown. The translation machine is comprised of a central processing unit 1 for processing translation process and other necessary processes, a main memory 2 for storing programs which are developed in order to execute necessary processes, a CRT display 3 for displaying possible translations etc., a keyboard 4 for entering data necessary for translation processing, a translation module 5 for storing data necessary for translation processing, a printer 7 an external memory means 8 such as a floppy disk and or the like.

Figure 2:
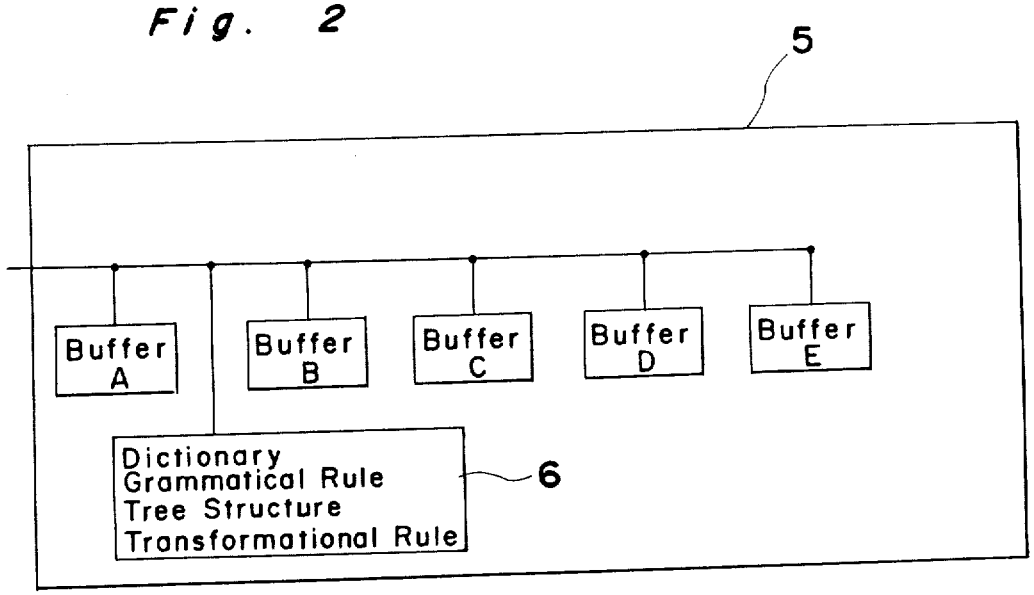
FIG. 2 is a block diagram showing a translation module shown in FIG. 1.

FIG. 2 shows an example of the translation module 5. The module 5 provides five buffers A, B, C, D and E, and a table means 6 including a dictionary for translation, grammatical rules and transformational rules for the so-called tree structure. As will be stated hereinafter, data obtained at each level of analysis in the processing of a translation are stored into these buffers A to E, respectively, according to the level of analysis.

Hereinafter, general principle employed in the machine translation process will be explained.

Figure 3:
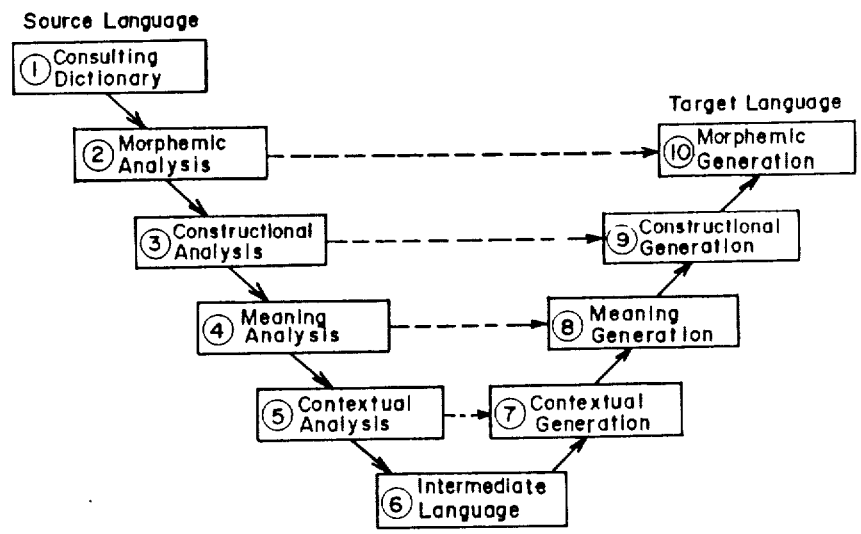
FIG. 3 is a schematic diagram showing various methods in the machine translation.

As shown in FIG. 3, there are provided many levels in the machine translation as is well known to those skilled in the art. When a source language is entered, analysis thereof is proceeded in the order of consulting the dictionary (level #1), morphemic analysis (level #2) and constructional analysis (level #3). The machine translation method is classified two ways according to the level to which the analysis is proceeded. One way is the so-called "Pivot Method" in which the analysis is proceeded to the level #6 wherein the source language is transformed or translated into so-called intermediate language constructed by general ideas being independent on either of existing languages and the target language is generated according to the intermediate language obtained. The other way is the so-called "Transfer Method" in which the analysis is proceeded to either one level of morphemic analysis (#2), constructional analysis (#3), meaning analysis (#4) and contextual analysis (#5) to obtain the internal structure of the source language, and then, the target language is generated by transferring each structure obtained in each analysis level into structure of the level corresponding thereto represented or indicated in the target language.

In Table 1, each content of these analysis-level is listed.

TABLE 1

| | |
| --- | --- |
| Consulting Dictionary | To consult the dictionary provided for translation about each word entered. |
| Morphemic Analysis | To obtain grammatical data such as a part of speech and an equivalent about the word. To analyze the tense, the person and the number of the word. |
| Constructional Analysis | To determine the construction of a sentence such a subordination between or among words. |
| Meaning Analysis | To decide whether or not each construction obtained is correct in respect of the meaning. |
| Contextual Analysis | To understand the subject of an original text and to clarify ambiguities and/or abbreviations. |

According to the present invention, only the result obtained through translation process is important irrespective of a level to which the analysis is to be proceeded. In the present embodiment, the analysis is proceeded to the level #3 of constructional analysis.

Figure 4:
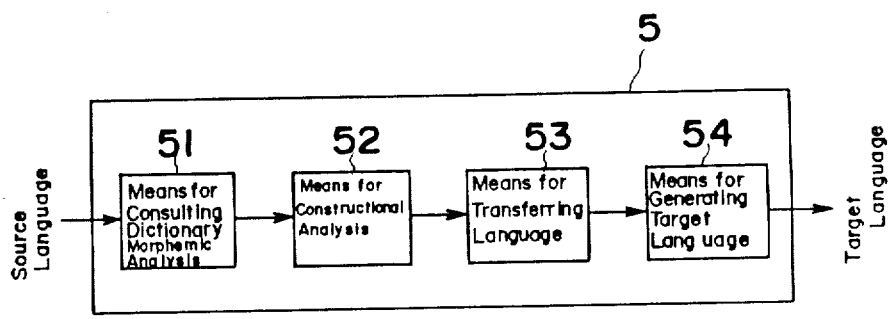
FIG. 4 is a block diagram showing functions of the translation module.

As shown in FIG. 4, the translation module 5 is functionally classified into means 51 for consulting with the dictionary and for analyzing morpheme, means 52 for analyzing construction, means 53 for transferring the source language to the target language and means 54 for generating the corresponding target language.

Figure 5:
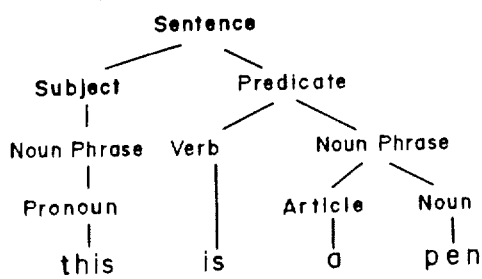
FIGS. 5(1), 5(2), 5(3), 5(4) and 5(5) show respectively contents stored in Buffers A to E of the module.
Figure 5:
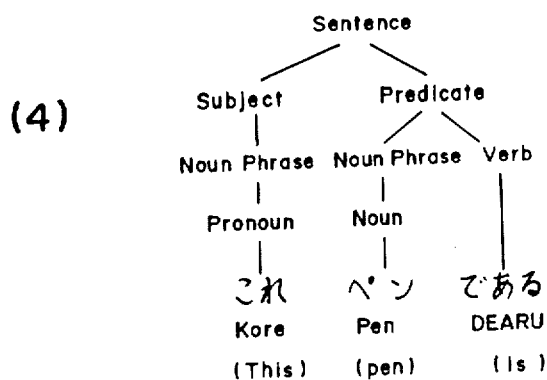

FIG. 5 shows the content of each buffer, shown in FIG. 2, during the process of translating an English sentence "This is a pen." into Japanese.

First, the original sentence is read into Buffer A as is shown in FIG. 5(1). The means 51 of the module 5 consult with the dictionary about each original word to obtain grammatical data and meanings thereabout. These data obtained are entered into Buffer B as is shown partially in FIG. 5(2).

In FIG. 5(2), data regarding the part of speech are shown. Although the word "this" has multiple parts of speech, the part of speech of "this" in this sentence is identified to a specified one as the result of the analysis by the constructional analysis means 52 and the tree structure thereof is entered into Buffer C as shown in FIG. 5(3). In this process, an analysis as shown in Table 2 is made based upon the grammatical rules (phrase structure rules) stored in Table means 6.

TABLE 2

| Word Group | → | Constituents |
| --- | --- | --- |
| Sentence | → | Subject, Predicate |
| Subject | → | Noun Phrase |
| Predicate | → | Verb, Noun Phrase |
| Noun Phrase | → | Pronoun |
| Noun Phrase | → | Article, Noun |

This rule indicated by an arrow (→) means that, for instance, "Sentence consists of the subject and predicate.".

The language transferring means 53 execute analysis using transfer rules of tree structure similarly to the constructional analysis, and the result obtained is stored into Buffer D. The target language generating means 54 supplements one or more suitable post-positional words functioning as an auxiliary to a main word and one or more auxiliary verbs so as to form a Japanese sentence, and the result obtained is stored into Buffer E (Result Buffer) as shown in FIG. 5(5). This result is output from the translation module 5.

Figure 6:
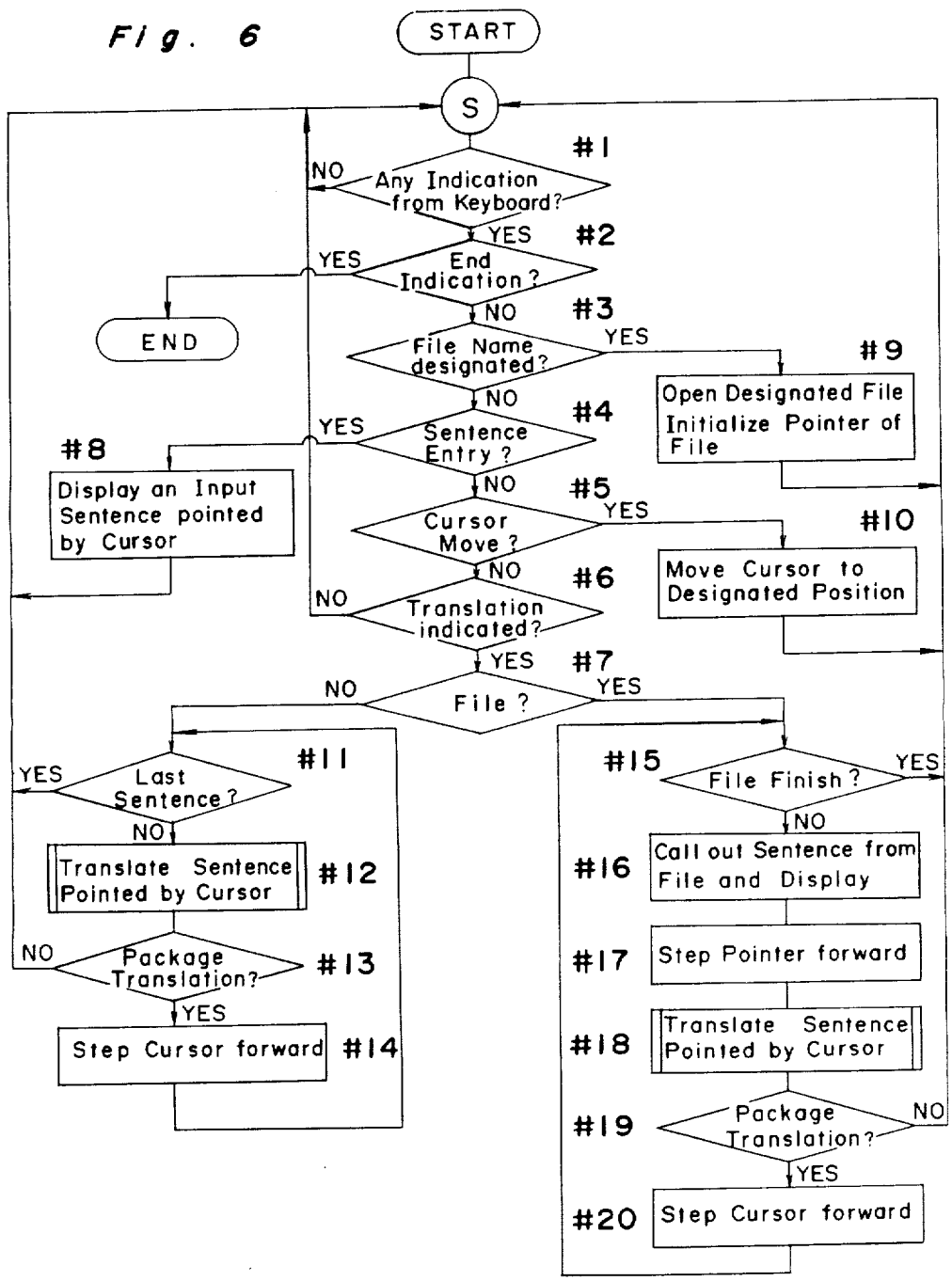
FIG. 6 is a flow chart showing an example of a translation control program being executed by CPU of the translation machine.

FIG. 6 shows a flow chart of a main routine program according to the present invention.

When the processing is started, it is checked at step #1 as to whether or not any indication is entered through the keyboard 4 by a user. If not, the process returns to wait an indication by the user. If the indication entered is an indication which indicates the completion of translation processing, the process is finished at step #2.

If a name of file is designated at step #3, the process proceeds to step #9. At step #9, the file designated is opened and the pointer of the file is set to a beginning end of the top sentence therein. The name of the file designated once is maintained effective until another name of a file is designated. The pointer of the file, as mentioned hereinafter, is stepped to the next sentence in the file successively at step #7 when the translation of file or the translation in a package of file is indicated.

If it is decided at step #4 that one sentence is entered by the user, the process proceeds to step #8. At step #8, the sentence entered is displayed on the CRT display in such a manner that the sentence is begun from a position indicated by a cursor on the display. This processing is carried out with use of the main memory 2 and CRT 3 under the control of CPU 1 as is well known to those skilled in the art.

At step #5, it is decided whether or not the cursor is indicated to move. If indicated to so move, the process proceeds to step #10 to move the cursor to a designated position. This processing is lso well known to those skilled in the art. The movement of the cursor is utilized for moving it back in order to translate a sentence again which has been translated once and/or for moving it forward in order to enter a next sentence after an exact translation of the present sentence has been output when a mode for selecting an exact translation among possible translations obtained with respect to each sentence entered is chosen. If the movement of the cursor was not indicated at step #5, the process proceeds to step #6 to check whether or not the translation is indicated. If it was decided at step #6 that the translation was indicated, the process proceeds to step #7 to check whether or not a file to be translated exists.

If any indications other than those mentioned above were indicated, the process returns to step #S since it means an error.

There are provided four modes of translation as follows:

(A) Sentence Translation

According to this mode, one sentence being pointed by the cursor on CRT 3 is translated.

(B) Package Translation

According to this mode, sentences from one pointed by the cursor to the last one on CRT 3 are translated in a package.

(C) File Translation

One sentence in the designated file being pointed by the pointer of file is called out on CRT 3 so as to position it at a position indicated by the cursor and then, is translated.

(D) Package File Translation

Sentences of the designated file from one pointed by the pointer of file to the last one are called out on CRT 3 so as to position the first one at a position indicated by the cursor and then, all the sentences are translated in a package.

In order to designate these four translation modes, four independent keys may be provided on the keyboard. However, it is desirable to utilize one of the function keys in order to reduce the number of independent keys to be provided for designating a desirable translation mode. Namely, a translation key and a file-translation key are provided as independent keys and these two translation keys are combined with one function key and each of four possible combinations is assigned to each translation mode as follows:

| Mode A (Sentence Translation) | "Translation Key" |
| Mode B (Package Translation) | "Function Key" and "Translation Key" |
| Mode C (File Translation) | "File Translation Key" |
| Mode D (Package File Translation) | "Function Key" and "File Translation Key" |

When mode A or B designated, the process proceeds from step #7 to step #11. At step #11, it is checked whether or not the sentence to be translated is the last one. If the cursor points to the bottom of the last sentence displayed on CRT 3, the process returns to step #S since there is no sentence to be translated. If the cursor does not point to the bottom of the last sentence, the process proceeds to step #12 to translate one sentence designated by the cursor. Then, it is checked at step #13 whether or not mode B is designated. If mode B is not designated, namely mode A designated, the process is returns to step #S.

If mode B is designated, the process proceeds to step #14 and the cursor is stepped forward to the top position of the next sentence in order to prepare the translation of the next sentence on CRT 3. Then, the process is looped to step #11 to check whether or not the sentence translated at step #12 is the last one. The loop from step #11 to step #14 is repeated until the last sentence on CRT 3 has been translated. When the last sentence has been translated, namely the package translation has been completed, the process returns from step #11 to step #S.

When mode C (File Translation) or mode D (Package File Translation) is indicated, the process proceeds from step #7 to step #15. At step #15, it is checked whether or not the pointer of file reaches to the bottom of the designated file. If the pointer points to the bottom of the file, the process returns to step #S, since there is no sentence to be translated further in the designated file. If the pointer is not at the bottom of the file, the process proceeds to step #16 to call out one sentence indicated by the pointer and to display it at a position indicated by the cursor on CRT 3. This proceeding itself is well known to those skilled in the art. Next, the process proceeds to step #17 to step the pointer to the top of the next sentence in order to prepare the translation of the next sentence. Then, the process proceeds to step #18. At step #18, the sentence called out at step #16 and pointed by the cursor is translated. Namely, the proceeding same of step #18 is the as that of step #12. At the next step #19, it is checked whether or not mode D (Package File Trnslation) is designated. If mode C (File Translation) is designated, the process returns from step #19 to step #S.

When mode D is indicated, the process proceeds to step #20 to step the cursor forward to the heading position of the next sentence. This proceeding is in preparation for translation of the next sentence. Then, the process is looped to step #15. The loop from step #15 to step #20 repeats until the last sentence has been translated, namely the package file translation has been completed. When the pointer is forwarded to the bottom of the file, the process returns from step #15 to step #S.

As is clearly understood from the above mentioned, the present invention is realized by the translation system composition shown in FIGS. 1 and 2 and translation program specified by the flow chart shown in FIG. 6.

Figure 7:
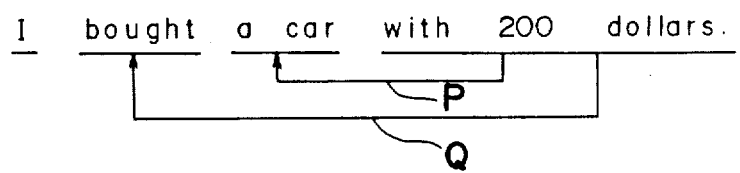
FIG. 7 shows possible subordination relations of the sentence.

It is to be noted that the subroutine of step #12 or step #17 provides a function that a next possible translation is output when said subroutine for translating one sentence is successively executed with respect to the same sentence. Namely in FIG. 7, for example, one translation is obtained at first according to the subordination indicated by an arrow P. And, when the same subroutine is executed without movement of the cursor, another translation is obtained according to the subordination indicated by an arrow Q. This function itself is well known to those skilled in the art.

In the preferred embodiment mentioned above, the sentence called out from the designated file is always translated without exception. However, it is possible to call out a sentence of the file on the CRT without an accompanying translation thereof. In this case, a sentence of the file is called out on CRT 3 at first and then, the translation thereof is done in a manner similar to that of the translation of the sentence entered through the keyboard. In order for that, the file translation key should be changed to a file-call key and, in the flow chart shown in FIG. 6, the content of step #6 is changed to include both the "Translation Mode" and the "File Call Mode" and, further, step #18 should be deleted. Namely, after one sentence of the file was called on CRT 3 at step #16, the translation thereof is executed at step #12 if the sentence translation mode was selected thereafter.

Furthermore, it is possible to provide a "File Call Key" in addition to the file translation key. In this case, the file call mode is newly added to the four translation modes mentioned above. In order for that, in the flow chart of FIG. 6, the content of step #6 should be changed to include both the "File Translation Mode" and the "Call Mode" and one more step should be provided for checking which mode is selected between step #7 and step #15. Namely, if the file translation mode is selected, the process proceeds to step #15, and, if the file call mode is selected, processes similar to the steps from step #16 to step #20, excluding step #18, are executed which should be added to the flow chart of FIG. 6.

Although the present invention has been fully described by way of example with reference to the accompanying drawings, it is to be noted here that various changes and modifications will be apparent to those skilled in the art. Therefore, unless indicated otherwise such changes and modifications depart from the scope of the present invention, they should be construed as being included therein.

What is claimed is:

1. A translation system for translating at least one sentence from a first language into a second language comprising:
   first translation means for translating said sentence into said second language such that only one translation is obtained;
   second translation means for translating said sentence into said second language such that at least a first draft sentence is obtained, said second translation means checking said draft sentence and permitting corrections of said draft sentence such that a package of sentences may be obtained with the sentence within said package which is closest in meaning to said sentence in the first language being used as a translated sentence in said second language; and
   means for selecting one of said first translation means and said second translation means whereby a draft of said sentence in said second language may be quickly obtained when said first translation means is selected and whereby a more accurate final translation of said sentence is permitted to be obtained when said second translation means is selected than when said first translation means is selected.

2. The translation system as recited in claim 1, wherein said at least one sentence to be translated is entered through a keyboard.

3. The translation system as recited in claim 1, wherein said at least one sentence to be translated is entered from an external memory means.

4. The translation system as recited in claim 1, in which there are provided a direct data entry means such as a keyboard for entering said at least one sentence to be translated and an indirect data entry means for reading and entering said at least one sentence stored in an external memory means and means for selecting one of the direct and indirect data entry means.

5. The translation system is recited in claim 1 further comprising means for inputting said at least one sentence into said system.

6. The translation system as recited in claim 5 further comprising:
   buffers for storing said sentence after said sentence is input to said system by said means for inputting;
   dictionary means for changing words of said sentence stored in said buffer from said first language to said second language to obtain an initial translation for each word of said sentence;
   means for analyzing which part of speech each word is in said sentence;
   means for forming at least a draft sentence in said second language by using said initial translation and analyzed parts of speech for each word;
   means for determining whether said initial translation for each word is consistent with at least the part of speech for each word;
   means for correcting said draft translated sentence if said means for determining determines said initial translation is inconsistent with said part of speech for said word; and
   means for clarifying at least one of ambiguities and abbreviations if any in said draft translated sentence;
   said first translation means and said second translation means both using said buffers, said dictionary means, said means for analyzing and said means for forming, and only said second translation means further using said means for determining, said means for correcting and said means for clarifying such that said package of sentences and said more accurate final translation of said sentence is obtained.

7. The translation system as recited in claim 6 wherein said means for analyzing which part of speech further determines a tense, person and number for each word of said sentence.

8. A translation system for translating at least one sentence from a first language into a second language comprising:
   direct data entry means for permitting an operator to enter said sentence;
   indirect data entry means for permitting an external memory means to enter said sentence;
   first selection means for selecting one of the direct and indirect data entry means;
   first translating means for translating said sentence entered by the selected one of said direct data entry means and said indirect data entry means into said second language such that one translation is obtained;
   second translation means for translating said sentence entered by the selected one of said direct data entry means and said indirect data entry means into said second language such that at least a first draft sentence is obtained, said second translation means checking said draft sentence and permitting corrections of said draft sentence such that a package of sentences may be obtained with the sentence within the package which is closest in meaning to said sentence in the first language being used as a translated sentence in said second language;

second means for selecting one of said first translation means and said second translation means whereby a draft of said sentence in said second language may be quickly obtained when said first translation means is selected and whereby a more accurate translation of said sentence is permitted to be obtained when said second translation means is selected than when said first translation means is selected.

9. A method for translating a sentence from a first language to a second language using a translation system, said method comprising:

selecting one of a first and second mode of operation for said system, said first mode permitting highly accurate final translations to be obtained, said second mode being quicker than said first mode and permitting draft form translations to be obtained;

inputting said sentence into said translation system;

consulting a dictionary in said system to obtain an initial translation for each word of said sentence;

analyzing which part of speech each word is in said sentence;

using said analyzing of said part of speech to place said initial translations for each word into a draft translated sentence; and determining the mode of operation for said system, whereafter if said system is in said second mode, said draft translated sentence is used as a translation for said sentence such that at least a draft of said sentence is obtained, however, if said sentence is in said first mode, said translating further comprises;

determining whether said initial translation for each word is consistent with at least the part of speech for each word, correcting said draft translated sentence if said initial translation is determined to be inconsistent with said part of speech for said word, clarifying at least one of ambiguities and abbreviations if any in said draft translated sentence, and using said draft translated sentence as said final translation for said sentence such that said highly accurate translation is obtained.

10. The method as recited in claim 9 wherein said step of analyzing which part of speech further comprises determining a tense, person and number for each word of said sentence.

* * * * *